United States Patent
Li et al.

(10) Patent No.: US 12,101,716 B2
(45) Date of Patent: Sep. 24, 2024

(54) USER EQUIPMENT INVOLVED IN TRANSMITTING UE ASSISTANCE INFORMATION

(71) Applicant: Panasonic Intellectual Property Corporation of America, Torrance, CA (US)

(72) Inventors: Hongchao Li, Langen (DE); Hidetoshi Suzuki, Kanagawa (JP); Yihui Li, Singapore (SG); Quan Kuang, Frankfurt (DE); Ankit Bhamri, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 494 days.

(21) Appl. No.: 17/372,112

(22) Filed: Jul. 9, 2021

(65) Prior Publication Data

US 2021/0337467 A1    Oct. 28, 2021

Related U.S. Application Data

(63) Continuation of application No. PCT/EP2019/075880, filed on Sep. 25, 2019.

(30) Foreign Application Priority Data

Jan. 10, 2019    (EP) .................... 19151275

(51) Int. Cl.
*H04W 52/00* (2009.01)
*H04W 52/02* (2009.01)
(Continued)

(52) U.S. Cl.
CPC ..... *H04W 52/0216* (2013.01); *H04W 52/367* (2013.01); *H04W 76/28* (2018.02)

(58) Field of Classification Search
CPC ............. H04W 52/0216; H04W 76/28; H04W 52/367
See application file for complete search history.

(56) References Cited

U.S. PATENT DOCUMENTS

| 2014/0056200 A1* | 2/2014 | Koc .................... H04W 72/541 |
| | | 370/311 |
| 2017/0118708 A1 | 4/2017 | Alon et al. |

(Continued)

FOREIGN PATENT DOCUMENTS

| JP | 2016136767 A | 7/2016 |
| WO | 2017/193274 A1 | 11/2017 |
| WO | WO 2018031966 A1 | 2/2018 |

OTHER PUBLICATIONS

Huawei et al., "Power saving techniques," R1-1812231, Agenda Item: 7.2.9.2.1, 3GPP TSG RAN WG1 Meeting #95, Spokane, USA, Nov. 12-16, 2018. (9 pages).

(Continued)

*Primary Examiner* — Erika A Washington
(74) *Attorney, Agent, or Firm* — Seed IP Law Group LLP

(57) ABSTRACT

The present disclosure relates to a user equipment (UE) that comprises a processing circuitry, for determining assistance information to be transmitted to a base station. A transmitter transmits an assistance report to the serving base station comprising the determined assistance information. The assistance information indicates one or more of the following assistance information types: a number of information bits, to be transmitted by the UE to the serving base station; transport block size of a transport block to be used by the UE to transmit the information bits to the serving base station; a power level, indicating a minimum power to be used by the UE to transmit the information bits to the serving base station; one or more Discontinued Reception, DRX, configuration parameters to be used by the UE to operate a DRX mechanism.

11 Claims, 7 Drawing Sheets

(51) Int. Cl.
  *H04W 52/36* (2009.01)
  *H04W 76/28* (2018.01)

(56) References Cited

U.S. PATENT DOCUMENTS

2018/0014255 A1  1/2018  Pelletier et al.
2018/0049272 A1  2/2018  Bagheri et al.

OTHER PUBLICATIONS

English Translation of Japanese Office Action, dispatched Jun. 27, 2023, for Japanese Patent Application No. 2021-537152. (8 pages).
3GPP TR 38.801 V14.0.0, "3$^{rd}$ Generation Partnership Project; Technical Specification Group Radio Access Network; Study on new radio access technology: Radio access architecture and interfaces (Release 14)," Mar. 2017, 91 pages.
3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 56 pages.
3GPP TR 38.913 V15.0.0, "3$^{rd}$ Generation Partnership Project; Technical Specification Group Radio Access Network; Study on Scenarios and Requirements for Next Generation Access Technologies; (Release 15)," Jun. 2018, 39 pages.
3GPP TS 36.213 V15.2.0, "3$^{rd}$ Generation Partnership Project; Technical Specification Group Radio Access Network; Evolved Universal Terrestrial Radio Access (E-UTRA); Physical layer procedures (Release 15)," Jun. 2018, 541 pages.
3GPP TS 36.331 V15.3.0, "3$^{rd}$ Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.
3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.212 V15.2.0, "3$^{rd}$ Generation Partnership Project; Technical Specification Group Radio Access Network; NR; Multiplexing and channel coding (Release 15)," Jun. 2018, 98 pages.
3GPP TS 38.213 V15.2.0, "3$^{rd}$ Generation Partnership Project; Technical Specification Group Radio Access Network; NR; Physical layer procedures for control (Release 15)," Jun. 2018, 99 pages.
3GPP TS 38.214 V15.2.0, "3$^{rd}$ Generation Partnership Project; Technical Specification Group Radio Access Network; NR; Physical layer procedures for data (Release 15)," Jun. 2018, 94 pages.
3GPP TS 38.300 V15.2.0, "3$^{rd}$ Generation Partnership Project; Technical Specification Group Radio Access Network; NR; NR and NG-RAN Overall Description; Stage 2 (Release 15)," Jun. 2018, 87 pages.
3GPP TS 38.321 V15.0.0, "3$^{rd}$ Generation Partnership Project; Technical Specification Group Radio Access Network; NR; Medium Access Control (MAC) protocol specification (Release 15)," Dec. 2017, 55 pages.
3GPP TS 38.331 V15.2.0, "3$^{rd}$ Generation Partnership Project; Technical Specification Group Radio Access Network; NR; Radio Resource Control (RRC) protocol specification (Release 15)," Jun. 2018, 304 pages.
Extended European Search Report, dated Oct. 1, 2019, for European Application No. 19151275.5, 11 pages.
Intel Corporation, "MAC entities to support multiple NR verticals," R2-168531, Agenda item: 9.2.1.3, 3GPP TSG-RAN2 Meeting #96, Reno, USA, Nov. 14-18, 2016, 6 pages.
International Search Report, mailed Jan. 7, 2020, for International Application No. PCT/EP2019/075880, 6 pages.
LG Electronics, "Way forward for eDRX," R2-152308, Agenda Item: 7.10, 3GPP TSG-RAN WG2 #90, Fukuoka, Japan, May 25-29, 2015, 4 pages.
NEC, "eDRX parameters mismatch between MME and UE," C1-170107, Agenda Item: 13.2.14, 3GPP TSG CT1 Meeting #100bis, Spokane, USA, Jan. 16-20, 2017, 4 pages.
Partial European Search Report, dated Jun. 28, 2019, for European Application No. 1915127.5, 14 pages.
Yang et al., "Traffic-Aware Dynamic Spectrum Access," Department of Computer Sciences, University of California, Santa Barba, USA, 2008, ISBN: 978-963-9799-36-3, 9 pages.
European Communication pursuant to Article 94(3) EPC dated Nov. 15, 2023, for the corresponding European Patent Application No. 19772759.7, 7 pages.
Qualcomm Incorporated, "Introducing Extended Idle mode DRX," S2-152291, Change Request, 23.682, CR0126, Current Version: 13.2.0, 3GPP TSG-SA WG2 Meeting #110, Dubrovnik, Croatia, Jul. 6-10, 2015, 2 pages.

\* cited by examiner

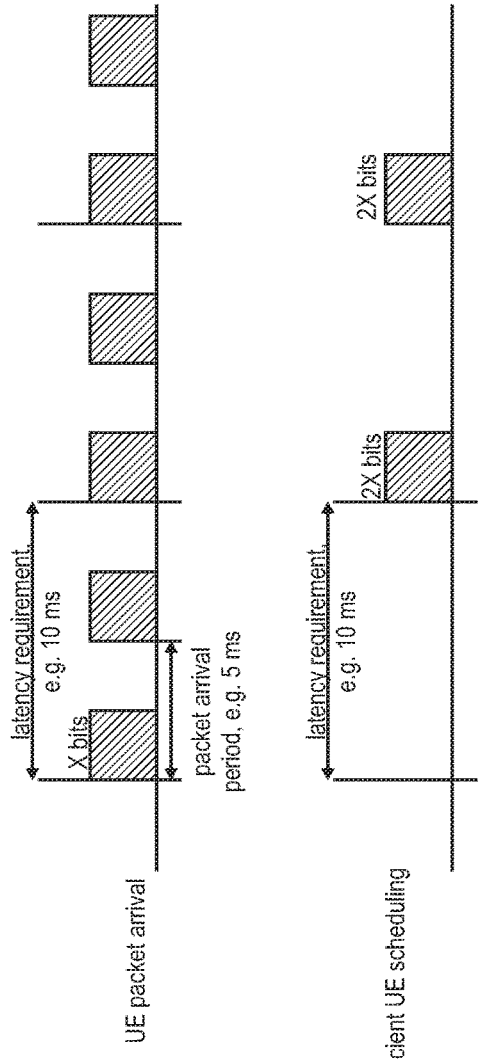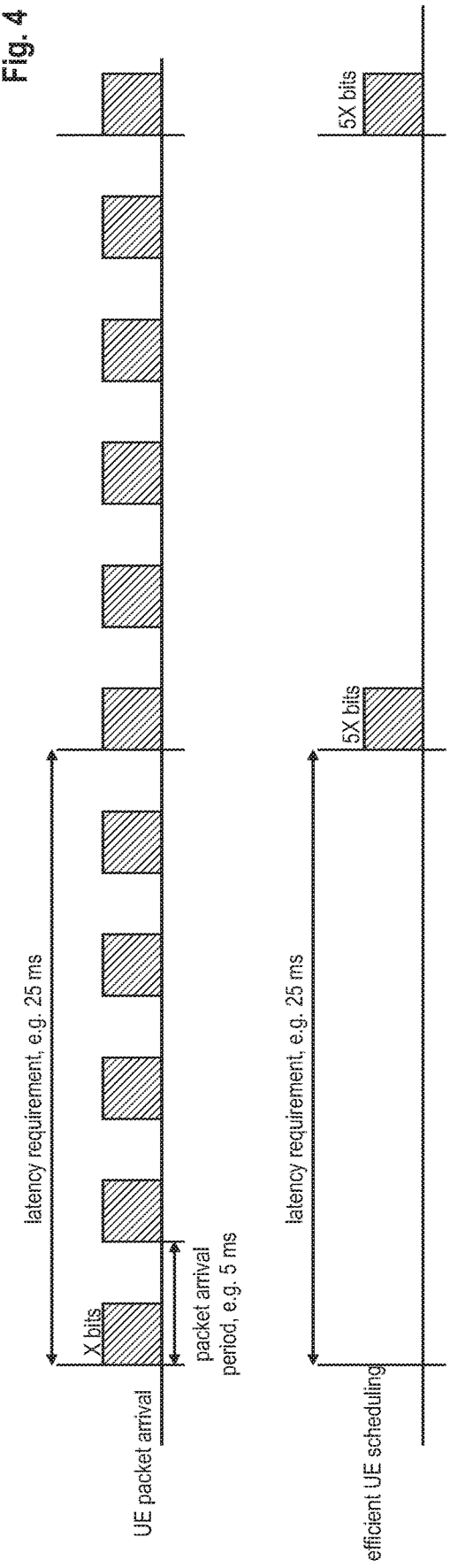
Fig. 3
Fig. 4

USER EQUIPMENT INVOLVED IN TRANSMITTING UE ASSISTANCE INFORMATION

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0 incorporated herein by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing improved procedures for transmitting UE assistance information from the UE to its serving base station.

In an embodiment, the techniques disclosed here feature a user equipment comprising a processing circuitry, which determines assistance information to be transmitted to a serving base station of the UE. A transmitter of the UE transmits an assistance report to the serving base station of the UE, the assistance report comprising the determined assistance information. The assistance information indicates one or more of the following assistance information types:
 a number of information bits, to be transmitted by the UE to the serving base station,
 a transport block size of a transport block to be used by the UE to transmit the information bits to the serving base station,
 a power level, indicating a minimum power to be used by the UE to transmit the information bits to the serving base station,
 one or more Discontinued Reception, DRX, configuration parameters to be used by the UE to operate a DRX mechanism.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIGS. 3 and 4 illustrates two uplink data transmission scenarios and the corresponding optimal scheduling.

DETAILED DESCRIPTION

5G NR System Architecture and Protocol Stacks 3GPP is working at the next release for the $5^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology." Results and agreements are collected in the Technical Report TR 38.804 v14.0.0, incorporated herein in its entirety by reference.

Figure 1:
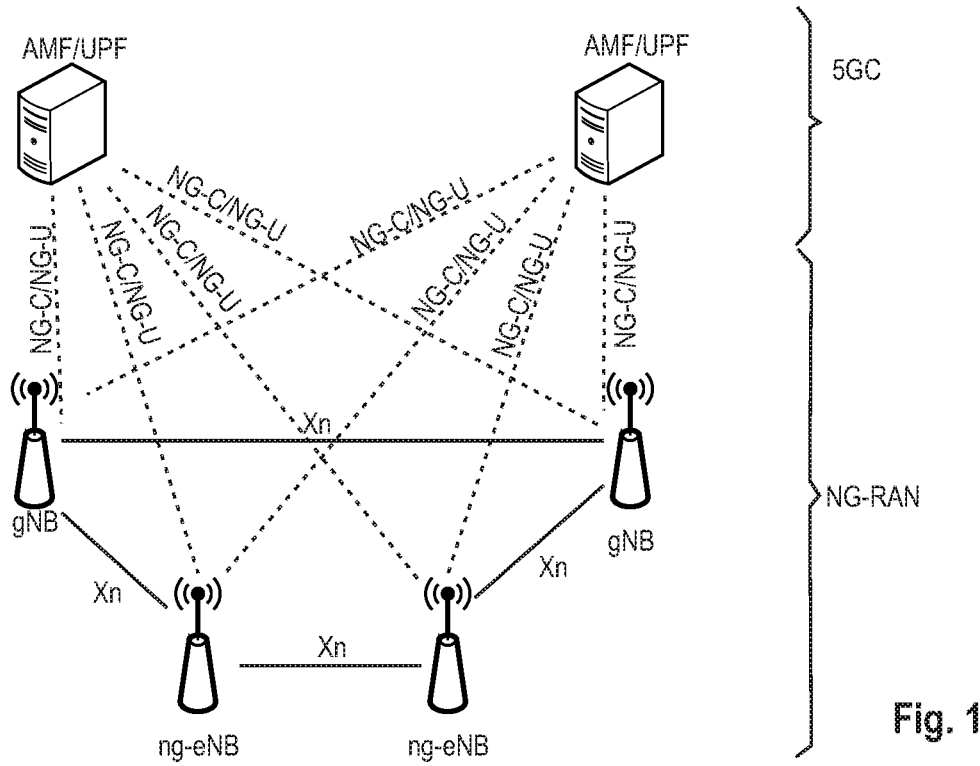
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.2.0, section 4 incorporated herein by reference).

Figure 2:
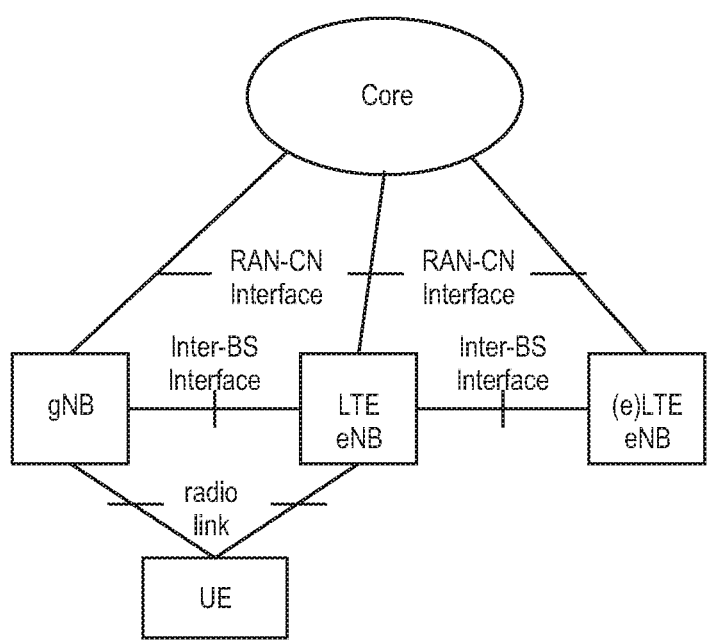
FIG. 2 shows an exemplary user and control plane architecture for the LTE eNB, gNB, and UE.

Various different deployment scenarios can be supported (see, e.g., 3GPP TR 38.801 v14.0.0 incorporated herein by reference). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300 v15.2.0, section 4.4.1 incorporated herein by reference) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300 version 15.2.0 incorporated herein by reference). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

For instance, the Medium-Access-Control layer handles logical-channel multiplexing, and scheduling and scheduling-related functions, including handling of different numerologies.

For the physical layer, the MAC layer uses services in the form of transport channels. A transport channel can be defined by how and with what characteristics the information is transmitted over the radio interface. The Random-Access Channel (RACH) is also defined as a transport channel handled by MAC, although it does not carry transport blocks. One of procedures supported by the MAC layer is the Random Access Procedure.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. (see 3GPP TS 38.211 v15.2.0 incorporated herein by reference).

UE Assistance Information

One goal is to achieve less UE power consumption. One option in said respect is to minimize the time duration of an uplink transmission, so as increase the sleep opportunities for the UE. This can be done, e.g., by aggregating data transmissions as much as possible in each transmission opportunity, taking into account the latency requirements to be fulfilled for the data transmission. The gNB should schedule the data transmissions accordingly.

FIGS. 3 and 4 illustrate two uplink transmission scenarios. In FIG. 3, it is exemplarily assumed that the UE has a traffic with x-bits packets arriving with a 5-ms periodicity, with an exemplary latency requirement of 10 ms. In this particular scenario the most power saving operation is to schedule the UE at least every 10 ms with an estimated transport block size (TBS) of 2 X bits, so as to allow the UE to sleep in the remaining time.

In FIG. 4, it is exemplarily assumed that the UE has a traffic with x-bits packets arriving with a 10-ms periodicity, with an exemplary latency requirement of 25 ms. In this scenario, a scheduling, different to the one in the FIG. 3 scenario, would be optimal. Namely that the UE is scheduled at least every 25 ms with an estimated TBS of 5 X bits. In both cases the continued sleeping opportunity is maximized while still complying with the latency requirements for the data traffic in the uplink.

For instance, the gNB would need to schedule the UE with suitable timing and information bits number/TBS, also considering the available UE power for better power saving, which may depend on the packet latency requirement and traffic type.

However, the inventors have recognized that (at least for the uplink) the gNB has not sufficient information to determine the optimal scheduling strategy. Thus, the scheduling parameters and opportunities provided by the gNB to the UE may not be optimal.

For uplink traffic, the UE has better knowledge of the UL-oriented traffic characteristics to be expected, such as the packet size, arrival/delivery interval, latency etc. A corresponding higher layer (e.g., application layer) could e.g. pass the information of (e.g., long term) traffic characteristic to the lower layer (e.g., RRC and/or MAC).

To address this issue, the UE provides assistance information to the gNB, so as to facilitate that the gNB can know how and when to schedule the UE uplink traffic for optimizing power saving.

Consequently, the inventors have identified the possibility to implement the transmission of UE assistance information according to the following solutions.

In the following, UEs, base stations, and procedures to meet these needs will be described for the new radio access technology envisioned for the 5G mobile communication systems, but which may also be used in LTE mobile communication system. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 5:
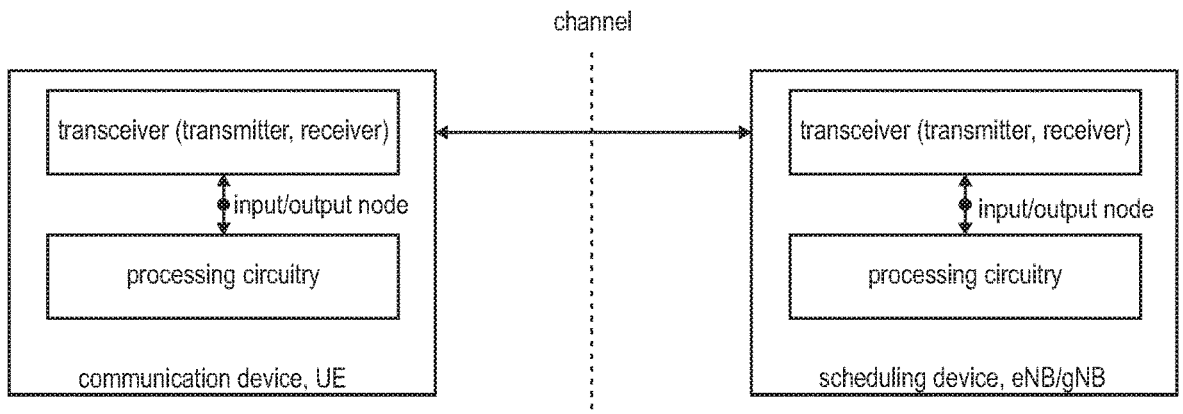
FIG. 5 illustrates the exemplary and simplified structure of a UE and a gNB.

FIG. 5 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Embodiment 1

Figure 6:
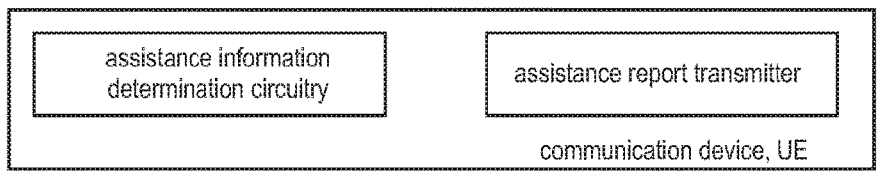
FIG. 6 illustrates a structure of the UE according to an exemplary implementation of a first embodiment.

A first embodiment will be described in the following with regard to FIGS. 6 to 8. FIG. 6 illustrates a simplified and exemplary UE structure according to the present solution and can be implemented based on the general UE structure explained in connection with FIG. 5 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE may include an assistance information determination circuitry and an assistance report transmitter in order to participate in the improved procedures for transmitting UE assistance information as will be explained in the following.

In the present case as will become apparent from the below disclosure, the processing circuitry can thus be exemplarily configured to at least partly perform one or more of the following steps of determining assistance information (e.g., different types thereof) and determining different intermediate parameters to derive the assistance information.

The transmitter can in turn be configured to be able to at least partly perform one or more of the following steps of transmitting assistance information, e.g., within an assistance report and transmitting uplink data.

Figure 7:
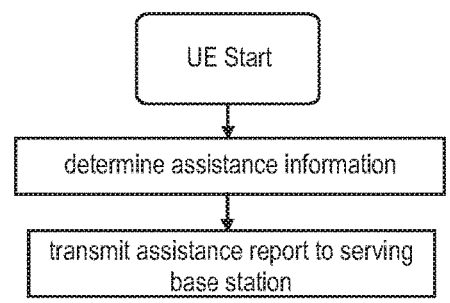
FIGS. 7 and 8 are flow diagrams for the behavior of a UE, according to exemplary implementations of the first embodiment.

FIG. 7 is a sequence diagram for the UE behavior according to this improved assistance information transmission procedure.

It is exemplarily assumed that the UE is exchanging data with its serving base station (e.g., gNB), e.g., uplink data traffic from a particular application. The UE is configured to assist the gNB in determining the optimum uplink scheduling for allocating radio resource to the UE for transmitting the uplink data traffic.

To said end, the UE may determine the assistance information and transmit same to the serving base station, e.g., as part of an assistance report.

There can be different types of assistance information, useful to the serving base station to determine an optimum uplink scheduling. In brief, the assistance information may indicate one or more of the following:

- a number of information bits, to be transmitted by the UE to the serving base station, for each scheduling,
- a transport block size of a transport block to be used by the UE to transmit the information bits to the serving base station, for each scheduling,
- a power level, indicating a minimum power to be used by the UE to transmit the information bits to the serving base station,
- one or more Discontinued Reception, DRX, configuration parameters to be used by the UE to operate a DRX mechanism.

More detailed exemplary implementations of these different types of information will be presented further below.

Generally, the assistance information is about the uplink traffic expected by the UE to occur in the near future, and thus provides the gNB with suitable information to adapt/optimize the uplink scheduling, performed by the gNB, to these future data traffic. For instance, providing assistance information to the gNB may facilitate that the gNB optimizes uplink scheduling with respect to saving power in the UE.

Correspondingly, the UE would receive from the gNB an uplink allocation message (e.g., DCI) to perform the corresponding uplink transmission of the data.

However, while above the main purpose of the assistance information is for assisting the uplink scheduling at the gNB, the use of the assistance information by the gNB is not restricted thereto. The assistance information could in addition or alternatively be used for a different purpose, such as downlink scheduling, load balancing, handover determination, etc.

As mentioned before, there are several different types of information that can be transmitted as the assistance information to the gNB side. Each type will be described in the following, including the advantages that can be derived therefrom when being used by the gNB to determine the uplink scheduling.

The assistance information might indicate the number of information bits to be transmitted by the UE to the gNB (put differently: suggested for each scheduling of the UE). In more detail, the UE may try to predict the future data traffic in the uplink, e.g., from traffic characteristics that are available at higher layers. In one exemplary solution, the number of information bits can be determined by the UE from the typical packet size of the uplink traffic, and/or the typical arrival time of the uplink traffic, and/or a latency requirement to be fulfilled for the uplink traffic.

In more detail, the typical packet size could be determined as being the size of the packet from a certain layer driven by one or more traffic/services, for example generated by the application layer, or split/concatenated by a higher layer.

In one exemplary solution the number of information bits can be determined based on the following formula:

$$I = U^* \mathrm{ceiling}(L/T),$$

wherein I is the number of information bits, L is a latency requirement to be fulfilled, T is the typical arrival time of the uplink traffic, and "ceiling( )" is the ceiling function.

This information on the number of information bits to be transmitted in the uplink can be used by the gNB to determine a suitable Transport Block Size (TBS) (see, e.g., 3GPP TS 38.214 and 3GPP 36.213). Further, the gNB can estimate and determine the proper bandwidth part to be used by the UE, and can perform the required bandwidth switching and configuration for this new bandwidth part. This allows to minimize the transmission duration and satisfy the latency requirement by an optimum uplink scheduling, which could also achieve traffic aggregation of different transmissions by the UE.

The assistance information might further indicate the transport block size. In a similar manner as for the number of information bits, the UE may try to predict the future traffic in the uplink, and based thereon, might predict the expected transport block size that would be optimally needed in said respect. For instance, the transport block size may be determined from one or more of the number of information bits, a coding rate and the modulation order.

In one exemplary solution the transport block size can be determined based on the following formula:

$$TBS = I^* C/M,$$

where TBS is the transport block size to be determined, I is the number of information bits, C is the coding rate, and M is the modulation order.

The coding rate and modulation order may be determined in turn from a modulation scheme to be used by the UE for transmitting the uplink data to the gNB. In case information on the modulation schemes not available at the UE, the UE may also use, e.g., a reference modulation scheme used primarily for determining the assistance information or might use a modulation scheme used so far by the UE for transmitting uplink data (e.g., from a previous uplink radio location).

The gNB, when receiving such an expected transport block size, can directly use same for the uplink scheduling, i.e., schedule the UE with the proposed TBS. Moreover, the base station can estimate and determine the proper bandwidth part to be used by the UE, in a similar manner as already explained above for the number of information bits. Correspondingly, the gNB could also perform the requirement bandwidth part switching and configuration for this new bandwidth part. This would allow the gNB to minimize the transmission duration and satisfy the latency requirement.

The assistance information might further indicate a (minimum) power level to be used by the UE to transmit data in the uplink. For instance, the power level might be determined based on one or more of the following: the number of information bits, a frequency bandwidth needed for transmitting the information bits in the uplink, and pathloss measurements (e.g., the last one) of the communication channel between the UE and the gNB.

In one exemplary solution, the power level can be determined based on the following formula:

$$P=10*lg(BW)+Po+alpha*PL,$$

where P is the power level, BW is the frequency band with, and the parameters Po and alpha are configured by the higher layer in a RRC message. These two power control parameters can be, e.g., configured by RRC (see, e.g., 3GPP TS 38.123, TS 36.213, TS 38.331, and TS 36.331). For instance, Po is the objective power, whereas alpha is the power compensation factor. In turn, the frequency bandwidth BW can be determined by the UE from the estimated information bits and the MCS level.

From this power level information, the gNB can, e.g., determine whether there is enough power at the UE to allocate a certain bandwidth part in the uplink. Furthermore, the base station can also estimate whether there is enough power at the UE to schedule radio resources for aggregating different traffic. Thus, the gNB may be enabled to judge the proper number of bits and bandwidth for the scheduling opportunities so as to reduce the UE power consumption.

The assistance information might further indicate one or more parameters related to the DRX mechanism used by the UE. In particular, it is exemplarily assumed that the UE and the gNB have configured a discontinued reception (DRX) mechanism for the UE. In one exemplary implementation for 5G the DRX mechanism as currently defined for 5G can be used (see, e.g., 3GPP TS 38.331 sections 4.4 and 6.3.2, as well as TS 38.321). Correspondingly, the DRX mechanism is operated according to several DRX parameters such as the ones mentioned in the above indicated 3GPP Technical Standards, e.g., drx-onDurationTimer, drx-InactivityTimer, drx-LongCycle, drx-ShortCycle, etc.

The UE might include a value suggestion for one or more of the DRX parameters within the assistance information, the suggested DRX parameter value being different from the value of the respective DRX parameter currently used by the UE to operate the DRX mechanism. The UE might determine to change one or more DRX parameters because UE may choose the preferred scheduling interval and active duration based on the estimation of the traffic arrival interval and latency requirement. Thus, the proposed DRX cycle can be aligned/close with the UE suggested scheduling interval. Optionally, the desired active duration can be aligned/close with the UE suggested drx-onDurationTimer. Or the UE directly suggests one DRX configuration index from the multiple DRX configurations configured by gNB.

The gNB, when receiving such a DRX parameter suggestion, can determine whether or how to adapt the DRX mechanism, e.g., to improve power saving possibilities for the UE. For instance, the gNB can schedule the UE with the proposed DRX configuration. Optionally, the gNB can change some of the parameters of the DRX configuration used by the UE, as proposed.

In the above discussion, different types of assistance information have been discussed so as to compile the assistance information to be transmitted to the gNB. So far, it has been exemplarily assumed that the different assistance information types refer to the complete UE operation. In addition, or alternatively, the different assistant information types can be however also determined for a subset of the UE operation, such as per type of traffic, per logical channel group, or per (higher-layer) application. The assistance information may for instance be restricted to only high-priority traffic, low-latency traffic etc.

For example, the assistance report can be in a form that it is associated with a certain type of traffic, or logical channel group or application. In the assistance report, multiple set of parameters can be contained, each of which has an index of and is linked to a certain type of traffic, or logical channel group or application.

For instance, it may be exemplarily assumed that the UE has two different traffic types, such as a first one for traffic with low latency requirements and a second one for relatively higher latency tolerant traffic. Correspondingly, in one implementation, some or all of the assistance information could be generated separately for the two available traffic types, and then jointly or separately transmitted to the gNB. In more detail, the number of information bits, the transport block size, the power level and the DRX configuration (or parameters thereof) can be specific to a particular traffic type.

In such an exemplary scenario, the assistance information may for instance additionally indicate the particular traffic type to which the assistance information relates. This is advantageous because the gNB, on the basis of this traffic-type-specific assistance information, can determine an optimized scheduling strategy to save UE power consumption by determining suitable scheduling parameters.

Similarly, it may be exemplarily assumed that the UE has data to be transmitted according to two different logical channel groups. A logical channel group is typically and exemplarily used in the context of buffer status reporting (see, e.g., 3GPP TS 38.321 v15.0.0 section 5.4.5), wherein logical channels which have similar scheduling requirements can be grouped together into one logical channel group for buffer status reporting. This concept can be reused for improving the assistance information reporting procedure discussed so far namely by compiling assistance information per logical channel group.

In more detail, the number of information bits, the transport block size, the power level as well as the DRX configuration can be specific to particular logical channel group.

In such an exemplary scenario, the system information may for instance additionally indicate the particular logical channel group to which the assistance information relates. This is advantageous because the gNB, on the basis of this logical-channel-group-specific assistance information, can determine an optimized scheduling strategy to save UE power consumption by determining suitable scheduling parameters.

In the above-described solutions, it has been exemplarily assumed that the different assistance information types directly indicate an absolute value representative of the type of information. For instance, the number of bits information would indicate for instance 5000 bits, a value that directly indicates the number of bits.

Alternatively however, other exemplary solutions can use differential values rather than absolute values to indicate an assistance information parameter. For instance, instead of indicating an absolute value (such as 5000 bits), the assistance information could indicate a differential value, such as +1000 bits, which together with a corresponding reference value (here, e.g., 4000 bits), would result in the absolute value that properly indicates the assistance information. For instance, the UE, when determining assistance information, would first determine the absolute value thereof and would then determine, based on the particular reference value, the differential value which then is encoded into the assistance information to be transmitted to the gNB. A corresponding determination would be performed at the gNB side, using the differential value in the reported assistance information together with a corresponding reference value (the same one is used by the UE) to finally obtain the absolute value of the particular assistance information type parameter.

There are different options on how to define the reference value for obtaining the differential value. For example, the reference value can be obtained from a previous report of the assistance information or a previous radio resource assignment (e.g., the TBS or power level).

The use of differential values, rather than absolute values, might allow reducing the amount of bits of the assistance information, because less number of different values per assistance information type are needed.

Moreover, the absolute value and/or the differential value may also be encoded not as the value itself but rather as an index associated with the value itself. For instance, for each assistance information type there could be a table with a number of different indexes (e.g., 8 in total, using 3 bits), wherein each index is associated with a different absolute or differential value of the assistance information type. When exemplary using the TBS for illustration purposes, 8 different TBS values could be encoded with a 3-bit index. Compared to directly encoding the value of the assistance information (e.g., a TBS value), many more bits would be needed which might further reduce the amount of bits of the assistance information.

In the above described solutions, it has be assumed that the assistance information is reported by providing (at least) one separate value per assistance information type. For instance, assuming that an assistance information report would include assistance information for TBS, power level, and the DRX configuration, the assistance information report would include one value indicating the TBS, one value indicating the power level, and at least one value for indicating the at least one DRX suggested configuration parameter. On the other hand, in addition or alternatively, a joint index can be used for indicating a combination of two or more of the assistance information types.

In the following, an exemplary implementation of the joint index is illustrated wherein one index indicates a combination of two different assistance information types, particularly the power level and TBS. It is further exemplarily assumed that the TBS is not encoded as a number of bits but as a classification of its size into high, medium and low, or 0.

| Joint Value index of Assistance information | Power Level | TBS |
|---|---|---|
| 1 | 23 dBm | High |
| 2 | . . . | . . . |
| 3 | . . . | . . . |
| 4 | . . . | Medium |
| 5 | . . . | . . . |
| 6 | . . . | . . . |
| 7 | −20 dBm | Low |
| 8 | 0 | 0 |

Correspondingly, the assistance information report can indicate the joint index 1 (e.g., 000 as a 3-bit value) to jointly indicate a power level of 23 dB and a high transport block size.

The above-discussed association between different indexes and different assistance information parameters (or combination of parameters) can be configured between the UE and the gNB using RRC messages, such as the RRC-ConnectionReconfiguration message.

There are different ways how the assistance information, respectively the assistance report can be transmitted to the gNB by the UE. In one exemplary solution, the assistance report can be transmitted as uplink control information of the physical layer (see 3GPP TS 38.212 or TS 38.213).

In addition or alternatively, the assistance report can be transmitted as a Medium Access Control (MAC protocol) Control Element (see 3GPP TS 38.321).

In addition or alternatively, the assistance report can be transmitted as a message (e.g., information element) of the Radio Resource Control protocol (see 3GPP TS 38.331). A new Information Element of the RRC could be used in said respect, or an already existing one, e.g., the "UEAssistanceInformation" IE, can be extended to carry this new UE assistance information, as discussed above (see 3GPP TS 36.331 v15.3.0 section 6.2.2 pages 371-374).

In an optional implementation, the report can be associated with one of the configured DRX configuration, which stands for the suggested scheduling interval. If the report is not associated with a DRX configuration, the report could be interpreted by the gNB to suggest to schedule the UE with at least the corresponding assistance information reported therein (for instance the information bits size or TBS) once the buffer of the UE is larger than a particular value.

In the above exemplary solutions, it has been assumed that the assistance information is transmitted for assisting the uplink scheduling. However, the above discussed solutions and implementations are not restricted to simply providing uplink assistance information. In addition or alternatively, the UE can provide assistance information to the gNB to assist downlink scheduling. The different solutions, variants and implementations described above for the uplink can be equally used for downlink assistance information, and thus repetition of the description said respect is avoided herein. For instance, different assistance information types may be useful for assisting the gNB in downlink scheduling, such as the number of information bits to be transmitted from the serving base station to the UE, a transport block size of a transport block to be used by the serving base station to transmit the information bits to the UE, and/or one or more DRX configuration parameters to be used by the UE to operate a DRX mechanism. Part or all of this information could be obtained from higher layers, e.g., an application layer, which knows how much data will be downloaded.

The downlink assistance information can be transmitted to the gNB together with or separate from the uplink assistance information.

In the above described exemplary solutions, the different assistance information types have been described that can be transmitted in a corresponding assistance information report to the gNB. In one exemplary implementation, the UE can itself decide which information is to be transmitted to the gNB, e.g., which types of assistance information are worth transmitting to the gNB for assisting the gNB in optimizing the uplink scheduling for the UE. On the other hand, the selection of the assistance information types to be reported to the gNB may be configured in advance by the gNB, for instance using RRC messages.

The following exemplary implementation will be described using an actual scenario in which the UE is assumed to transmit information bits for two different Logical Channel Groups LCG #1 and LCG #2. In particular, it is exemplarily assumed that the UE estimates a TBS of 5000 bits for LCG #1 associated with a DRX configuration having a 10 ms cycle (e.g., the packet delivery latency is 10 ms, such that a DRX configuration with a cycle period of 10 ms is suitable). On the other hand, the UE estimates a TBS of 10000 bits for LCG #2, associated with a DRX configuration having a 20 ms cycle.

Based on a modulation and coding scheme used in a previous (e.g., latest) uplink grant (alternatively in a different configured reference MCS value), the UE then estimates a needed frequency bandwidth (e.g., number of PRBs, physical resource blocks) and further estimates the needed power level (e.g., for LCG #1, 10 dBm, and for LCG #2, 13 dBm). The UE then compiles the assistance information on the power level and TBS into a corresponding assistance information report and transmits same to the gNB. By using the TBS and power level information (e.g., rather than directly providing the bandwidth part information) to the gNB, the gNB may be provided with more accurate information to decide the most power efficient uplink scheduling strategy for both LCGs with good traffic adaptation.

In turn, the gNB, based on this report and also taking into account other UEs present in its radio cell, may determine a proper uplink bandwidth part and scheduling slots to be used in scheduling that UE from which the report was received. Since the received UE assistance information report is directed to more than one LCG, the gNB may also try to consider traffic aggregation across the different LCGs if possible. Taking everything into account, the gNB performs uplink scheduling and thus may for instance allocate a suitable uplink bandwidth part, wherein the UE is scheduled every 10th ms and kept asleep in the remaining 9 ms. In slots #2n*10 (20, 40, 60, 80 . . . ) a larger bandwidth part is used and a transport block size of 15000 bits, because the power of 14.7 dBm (10 dBm+13 dBm) available to the UE is enough for both traffics simultaneously. Aggregating the packets of two different logical channel groups allows to minimize the scheduling duration and thus allows the UE to save power.

On the other hand, in slots #(2n+1)*10 (10, 30, 50, 70 . . . ), the UE may be scheduled with a smaller bandwidth part and scheduled with a transport block size of only 5000 bits with respect to LCG #1.

In a corresponding exemplary variation of the implementation, if the associated DRX configuration is not reported within the assistance information, the gNB shall schedule the UE once the accumulated buffer exceeds the report suggested TBS.

Figure 8:
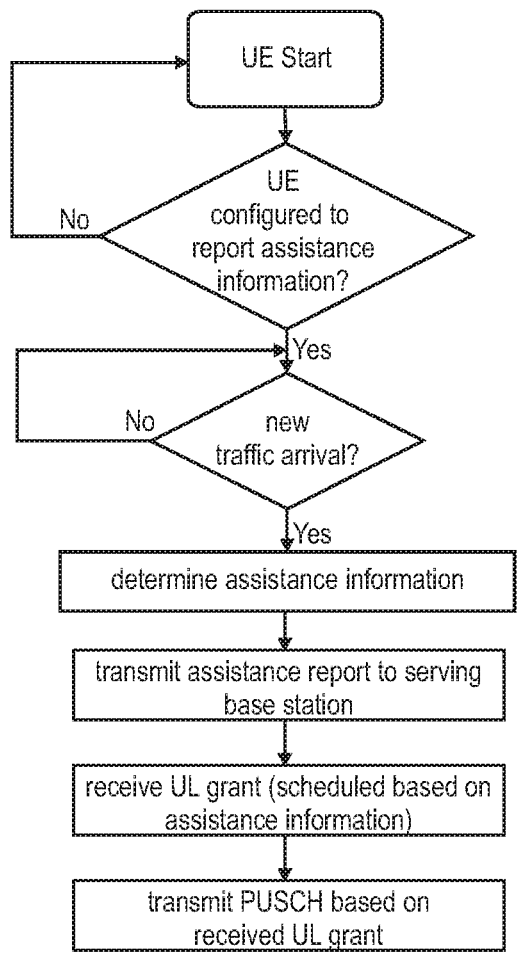

FIG. 8 is a sequence diagram for the UE behavior according to a more detailed and exemplary implementation of the above solutions. In particular, and compared with the more basic flow diagram of FIG. 7, the UE first determines whether it is even configured to provide assistance information to the gNB and proceeds only in the positive case. The UE may then use the arrival of the new data traffic as the trigger to determine and report assistance information to the gNB. As discussed above, the gNB may, based on the received assistance information, determine an optimal scheduling for the UE and provide a corresponding uplink grant to the UE. Correspondingly, the UE receives the uplink grant that is scheduled based on the previously reported assistance information. In turn, the UE may perform an uplink transmission (e.g., PUSCH) based on the received uplink grant.

Embodiment 2

A second embodiment will be described in the following with regard to FIGS. 9 to 16. The second embodiment relates to the improvement of the active time usage at the UE. In more detail, the inventors have recognized the problem that the UL data traffic can be rather dynamic and may arrive right at the end of the UE active time period of the DRX mechanism. In that case, the UE might not be able to react on the new data arrival appropriately before entering DRX off period of the DRX mechanism. Furthermore, this may cause an unnecessary UE transition to the sleep period, involving ramping down and ramping up of the RF unit and possibly other hardware parts, which is power consuming.

Figure 9:
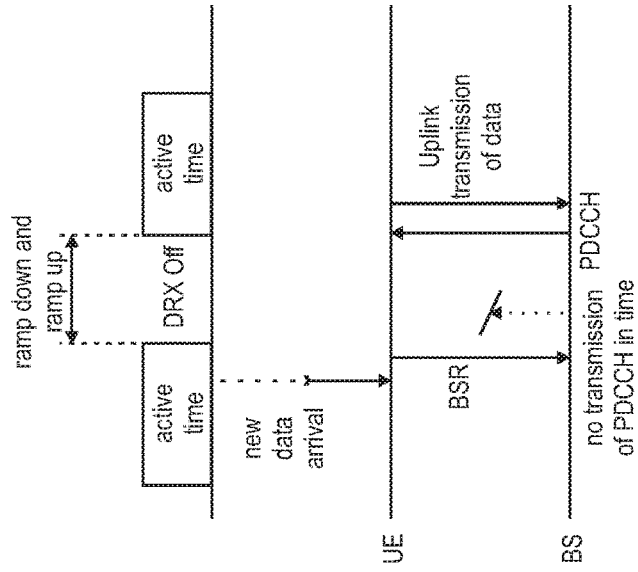
FIGS. 9 and 10 illustrate problematic scenarios for operation of the DRX mechanism and the active time.
Figure 10:
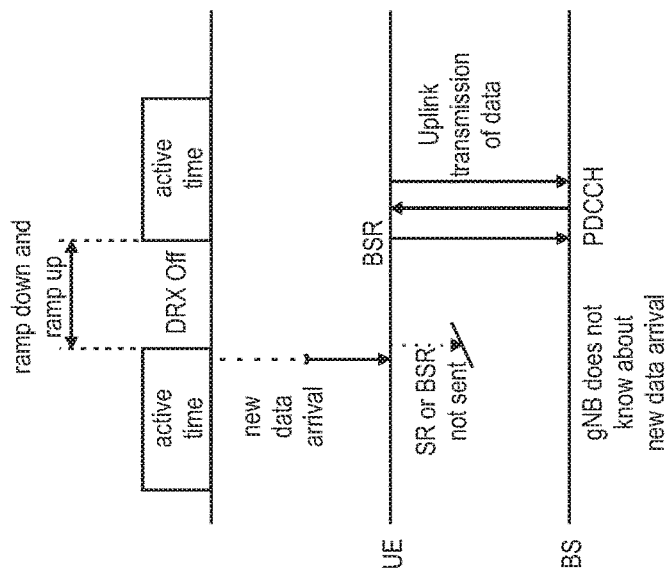

These problematic scenarios are illustrated schematically and exemplarily in FIGS. 9 and 10. As apparent therefrom, the new data arrival is near the end of the active time period. In the exemplary scenario of FIG. 9 the UE does not have time to even transmit to the gNB (BS, base station in the figure) the BSR (Buffer Status Report, indicating the new data); or the Scheduling Request (SR) if no BSR resources are available. Correspondingly, the UE enters the DRX off period of the DRX mechanism to save power, ramping down and eventually ramping up when exiting the DRX off period. During the next active time, the UE will take the opportunity to transmit the BSR to the gNB. It is exemplarily assumed that the gNB responds with an uplink grant (PDCCH), which the UE is able to receive during the active time (in active time UEs monitor the PDCCH). In turn, the UE can transmit the previously arrived data in the uplink to the gNB. Such a situation leads to a delay in sending the data to the gNB, as well as to a higher power consumption because of the ramping down and up involved.

On the other hand, as illustrated in FIG. 10, though the UE might have sufficient time to transmit the BSR to the gNB, there is no time for the gNB to process the BSR (e.g., received within a MAC CE) and send a PDCCH to the UE, before the UE exits the active time (and thus stops monitoring PDCCH). Scheduling the UE for an uplink transmission may only be possible at the next active time period of the normal DRX mechanism.

The second embodiment provides a solution to this problem by implementing a mechanism to extend the active time, as will be described in the following.

The UE is exemplarily assumed to be configured with a typical DRX mechanism according to which periods of active time (normal communication is possible, involving monitoring of PDCCH) alternate with sleep periods (DRX off, allowing for power saving opportunities) for the UE.

Figure 11:
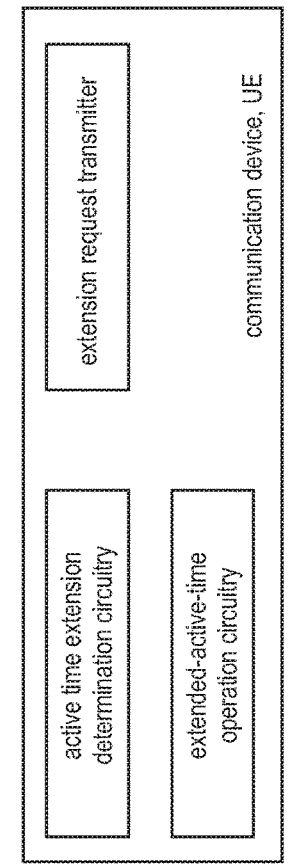
FIG. 11 illustrates a structure of the UE according to an exemplary implementation of a second embodiment.

FIG. 11 illustrates a simplified and exemplary UE structure according to the present solution and can be implemented based on the general UE structure explained in connection with FIG. 5 above. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent therefrom, the UE may include an extension request transmitter, active time extension determination circuitry, and extended-active-time operation circuitry in order to participate in the improved procedures for performing an extension of active time as will be explained in the following. In the present case, the processing circuitry can thus be exemplarily configured to at least partly perform the step of autonomously determining to extend the active time, upon transmitting the extension request. The transmitter can thus be exemplarily configured to at least partly perform the step of transmitting the extension request.

Figure 12:
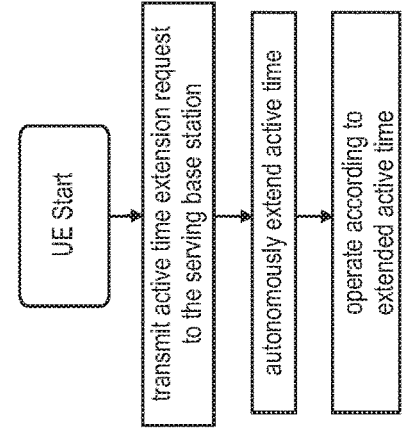
FIG. 12 is a flow diagram for the behavior of a UE, according to an exemplary implementation of the second embodiment.
Figure 13:
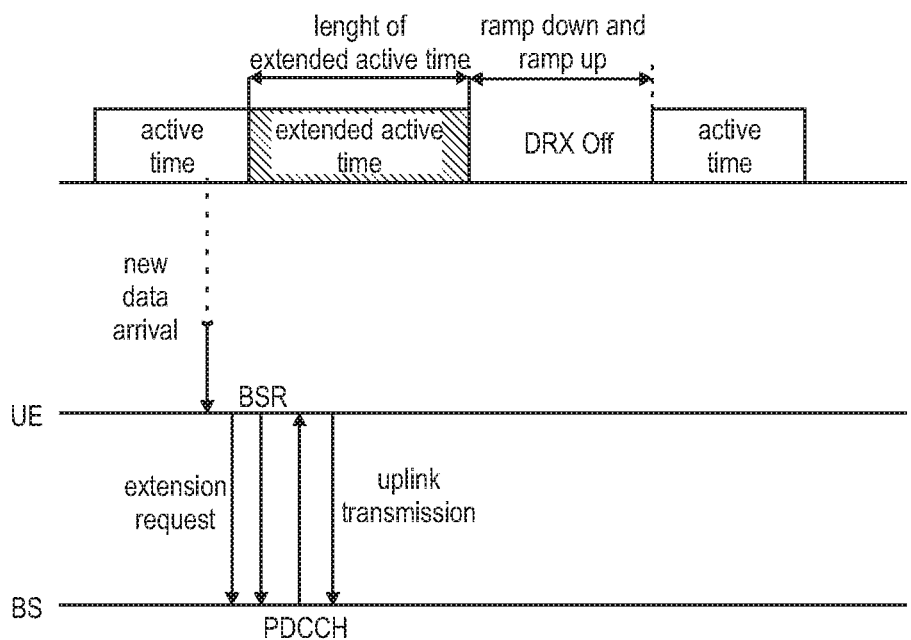
FIG. 13 illustrates the interaction of the active time extension with the UE transmission of the data, according to an exemplary implementation of the second embodiment.

FIG. 12 is a sequence diagram for the UE behavior according to this improved active time operation procedure, involving the extension of active time by the UE.

In order to extend an ongoing active time, the UE may transmit to its serving base station (gNB) an extension request, and then may autonomously determine to extend the active time. For instance, the UE, after transmitting the extension request, does not wait for a response from the gNB, but extends the active time on its own. Thereby, the "normal" DRX operation is momentarily suspended, because the UE stays in extended active time rather than following the normal DRX operation to enter DRX off time. The UE correspondingly proceeds to operate according to the extended active time.

Thereby, unnecessary transitions of the UE to sleep may be avoided, as well as the associated ramp-down and ramp-up power overhead.

According to one example, the UE behavior during the extended active time may be similar or exactly the same as during the normal active time of the DRX mechanism. For instance, the UE behavior may involve PDCCH monitoring, PDSCH reception and PUSCH transmission etc.

Continuing to operate according to extended active time facilitates the UE to complete the process that initially triggered the UE to extend the active time in the first place.

Extending the active time according to any one of the solutions and variants discussed herein may be triggered by a variety of reasons, such as the arrival of new data (as mentioned in connection with FIGS. 9 and 10) or the need to transmit a power headroom report (PHR) or simply that the UE is already aware that new data will come in the short future even though no new data is available for transmission right now.

When exemplarily assuming that the arrival of new data triggered the active time extension, the UE, during the extended active time, may transmit the BSR (Buffer Status Report) to the gNB, so as to be scheduled according with uplink radio resources (via a PDCCH DCI) to be able to then perform an uplink transmission of the new data. This is exemplarily illustrated in FIG. 13, which illustrates that during the extended active time, the BSR is transmitted by the UE to the gNB, the PDCCH is transmitted from the gNB to the UE, and the uplink transmission is performed by the UE.

There are several options on how the extended active time can be terminated. One exemplary option would be to extend the active time for a determined amount of time. This extended active time length can be, e.g., configured in advance between the UE and the gNB, e.g., using RRC. According to a different option, the length of the extended active time could be determined unilaterally by the UE, e.g., based on the trigger event for extending the active time. Optionally, information on the determined length of the extended active time can be transmitted to the gNB, e.g., together with the extension request. Still another option is to extend the active time until the next active time of the normal DRX mechanism (not shown in Figures).

Figure 14:
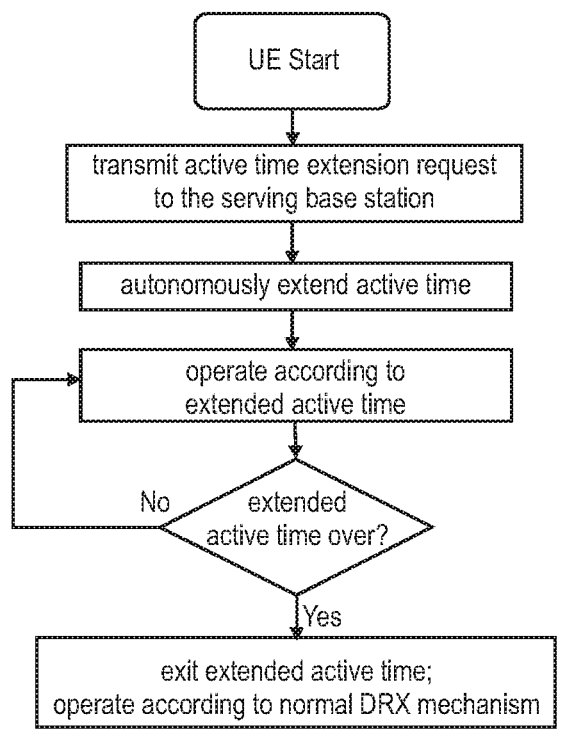
FIG. 14 is a flow diagram for the behavior of a UE, according to an exemplary implementation of the second embodiment.

FIG. 14 is an exemplary sequence diagram for the UE behavior according to one of the solutions, extending the UE behavior illustrated in FIG. 12 by providing a general determination as to whether the extended active time is over or not. If the extended active time is not over, the UE continues to operate according to the extended active time. Conversely, if the extended active time is over (e.g., after a couple of ms), the UE exits the extended active time and continues to operate according to the normal DRX mechanism. For instance, the scenario in FIG. 13 assumes that the normal DRX operation when exiting the extended active time is still the DRX off time.

Figure 15:
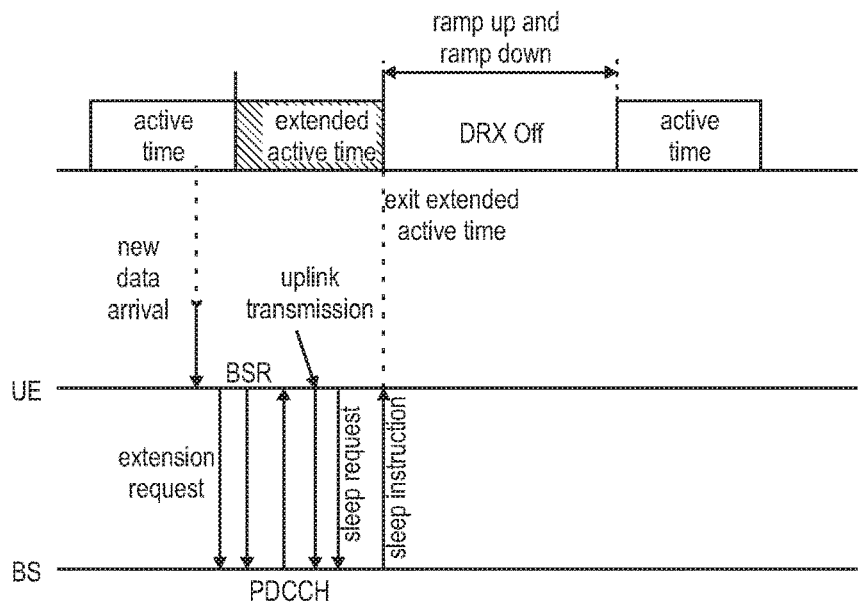
FIG. 15 illustrates the interaction of the active time extension with the UE transmission of the data, according to another exemplary implementation of the second embodiment.
Figure 16:
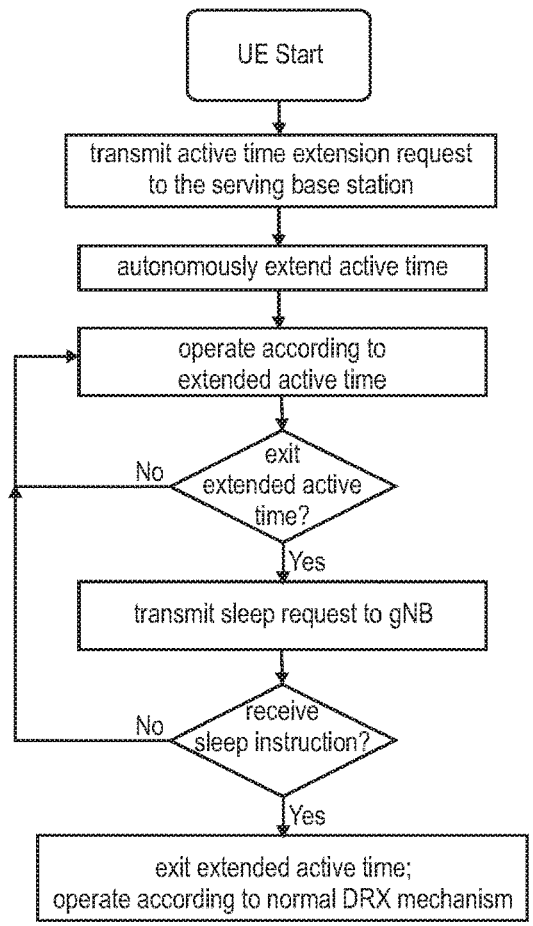
FIG. 16 is a flow diagram for the behavior of a UE, according to another exemplary implementation of the second embodiment.

According to a still different option, terminating the extended active time is requested by the UE from the gNB using a sleep request, as will be explained in the following. FIGS. 15 and 16 illustrate this solution. FIG. 16 is an exemplary sequence diagram for the UE behavior according to this solution, which extends the UE behavior illustrated in FIG. 12, by providing to the gNB (BS, base station in the figure) for transmitting a sleep request to the gNB when the UE determines that the extended active time is to be terminated. The UE furthermore checks whether a sleep instruction is received from the gNB (transmitted by the gNB in response to the sleep request). When no such sleep instruction is received, the UE continues operating according to the extended active time. When receiving such a sleep instruction from the gNB, the UE may exit the extended active time and continue to operate according to the normal DRX mechanism.

One benefit that can be obtained by using a sleep request is that the length of the extended active time can be flexibly adapted to the traffic conditions at the UE. For instance, when requesting the extension of the active, the UE may then be scheduled with a higher TBS and power, such that the uplink transmission of data can be terminated earlier, and thus the sleep request can be sent earlier. On the other hand, when the UE is scheduled with a lower TBS and power, the UE may take longer to transmit the data in the uplink; the sleep request would be transmitted later. In any case however, the length of the extended active time matches the time actually needed by the UE and thus provides an optimum power saving while still allowing the early data transmission.

Although above the sleep request is transmitted by the UE to exit the extended active time, the use of the sleep request can be extended to exit the normal active time of the DRX mechanism. In such a case, exemplarily, the UE may transmit the sleep request during the normal active time, e.g., when it determines that no traffic is expected and there is an additional opportunity to sleep and save power. In the same or similar as explained above, the UE may transmit the sleep request to the gNB, and upon receiving a corresponding sleep instruction, enter the DRX-off time period until the next instance of an active time of the DRX mechanism.

As mentioned before, the extension of the active time can be decided by the UE for a couple of different reasons. Moreover, the extension request transmitted by the UE can be extended with suitable indications to provide the gNB with information as to why the active time request was transmitted by the UE. Correspondingly, the UE may transmit the extension request together with indications regarding one or more of the following: new data to be transmitted to the serving base station, a new buffer status report to be transmitted by the UE to the serving base station, or a new power headroom report to be transmitted by the UE to the serving base station.

According to one exemplary solution, the additional information may indicate one or more of the following:
newly arrived BSR
I have no immediate data to be sent, but please do not let drx-Inactivity Timer expire"
Suggested DRX_On extension period being 5 ms
Latest PHR
"I still have at least x information bit/TBS coming to be sent, please extend DRX_ON
Estimated needed power level for newly arriving data Moreover, there are several possibilities on how exactly the active time extension request can be transmitted to the gNB. Generally, the UE may use a PUCCH resource or a PUSCH resource. For instance, the UE may use a PUCCH resource, which is available before the end of the DRX_ON (Active time). Particularly, the extension request can be transmitted in any of the configured resources within a time instance before the end of the active time, e.g., a periodic resource of every 5 ms. One possible exemplary configuration is that the extension request is transmitted in the last opportunity/instance within configured time instances. Exemplarily, the UE can reuse the configured radio resource for transmitting a scheduling request, and/or extend the current scheduling request indication to also carry the active time extension request.

In another solution, the UE can transmit the extension request as uplink control information (UCI) or a MAC Control Element on a PUSCH resource, under the assumption that a suitable PUSCH resource is available. Again, the UE may use a PUSCH resource, which is the last possible resource before expiry of the active time.

In one further exemplary solution, whether the UE may use resources other than those at the very end of the active time may depend on the reason for extending the active time and/or the information that is transmitted together with the extension request. For instance, the active time extension request may be transmitted only at the last opportunity in an active time, when the reason is the transmission of a power headroom report or the arrival of new data (new BSR) or the arrival of new data in the near future.

Moreover, the second embodiment described herein may be also combined with the first embodiment described above. For instance, the request for an extension of the active time can be transmitted together with the assistance information to the gNB. In one exemplary solution, the assistance information to be transmitted to the gNB in such a case where the active time is to be extended, can be one or more of:
a number of bits expected to be sent by the UE to the serving base station,
a power level needed to transmit new data to be transmitted by the UE to the serving base station.

Thereby, the advantages of the first and second embodiments can be combined.

Further Aspects

According to a first aspect, a UE is provided which comprises processing circuitry, which in operation, determines assistance information to be transmitted to a serving base station of the UE. A transmitter of the UE transmits an assistance report to the serving base station of the UE, the assistance report comprising the determined assistance information. The assistance information indicates one or more of the following assistance information types:
a number of information bits, to be transmitted by the UE to the serving base station,
a transport block size of a transport block to be used by the UE to transmit the information bits to the serving base station,
a power level, indicating a minimum power to be used by the UE to transmit the information bits to the serving base station,
one or more Discontinued Reception, DRX, configuration parameters to be used by the UE to operate a DRX mechanism.

According to a second aspect provided in addition to the first aspect, the UE further comprises a receiver, which in operation, receives from the serving base station a radio resource assignment usable by the UE to perform an uplink transmission.

According to a third aspect provided in addition to the first or second aspect, the assistance report is transmitted as a physical layer Uplink Control Information, UCI, or a Medium Access Control, MAC, Control Element or as a message of the Radio Resource Control, RRC, protocol, optionally in an information element of the RRC protocol message.

According to a fourth aspect provided in addition to any of first to third aspects, the number of information bits is determined by the UE based on one or more traffic characteristics, such as at least one of the following:
a typical packet size of the uplink traffic, U, to be transmitted by the UE to the serving base station,
an typical arrival time of the uplink traffic, T,
a latency requirement to be fulfilled for the uplink traffic, L, optionally wherein the number of information bits, I, is determined based on the following formula:

$I=U*\text{ceiling}(L/T).$

According to a fifth aspect, provided in addition to one of the first to fourth aspects, the processing circuitry, when in operation, determines the transport block size of a transport block, based on at least one of the following:
the number of information bits, I,
a coding rate, C,
a modulation order, M,
optionally wherein the transport block size, TBS, is determined based on the following formula:

$TBS=I*C/M.$ optionally wherein the processing circuitry, when in operation, determines the coding rate and the modulation order from a modulation and coding scheme, MCS, level, assigned to the UE by the serving base station in a previous uplink radio resource assignment or in a reference MCS level.

According to a sixth aspect, provided in addition to one of the first to fifth aspects, the processing circuitry, when in operation, determines the power level based on one or more of:
the number of information bits, I,
a frequency bandwidth needed for transmitting the number of information bits from the UE to the serving base station, BW,
pathloss measurement of the path between the UE and the serving base station, PL,
optionally wherein the power level, PC, is determined based on the following formula:

$PC=10*lg(BW)+Po+\text{alpha}*PL,$ where Po and alpha are configured by the higher layer in a RRC message.

According to a seventh aspect provided in addition to one of the first to sixth aspects, the assistance information is associated with a DRX configuration. Optionally, the assistance information indicates one or more DRX configuration parameters different from respective DRX configuration parameters currently used by the user equipment for operating the DRX mechanism.

According to an eighth aspect provided in addition to one of the first to seventh aspects, the processing circuitry, when in operation, determines the assistance information per type of traffic and/or per logical channel group.

According to a ninth aspect provided in addition to one of the first to eighth aspects, the assistance information comprises a separate value for each assistance information type, optionally wherein the separate value is determined by the processing circuitry, based on an association between different separate values and the association information type. The assistance information comprises one joint value for a combination of two or more of the assistance information types, optionally wherein the joint value is determined by the processing circuitry, based on an association between different joint values and different combinations of assistance information types. Optionally, the association is configured by the UE based on an RRC message received from the serving base station.

According to a tenth aspect, provided in addition to one of the first to ninth aspects, the assistance information types are encoded using absolute values. Alternatively, the assistance information types are encoded using differential values, being differential with respect to a reference value, wherein the absolute value of each assistance information type is determined based on the differential value and the reference value, optionally wherein the reference value is determined by the mobile terminal based on a previous radio resource assignment received from the serving base station.

According to an eleventh aspect, provided in addition to one of the first to tenth aspects, the assistance information further indicates one or more of the following assistance information types:
  a number of information bits, to be transmitted by from the serving base station to the UE,
  a transport block size of a transport block to be used by the serving base station to transmit the information bits from to the UE,
  one or more Discontinued Reception, DRX, configuration parameters to be used by the UE to operate a DRX mechanism.

According to a twelfth aspect, a method is provided, comprising the following steps performed by a user equipment, UE:
  determining assistance information to be transmitted to a serving base station of the UE,
  transmitting an assistance report to the serving base station of the UE, the assistance report comprising the determined assistance information,
  wherein the assistance information indicates one or more of the following assistance information types:
    a number of information bits, to be transmitted by the UE to the serving base station,
    a transport block size of a transport block to be used by the UE to transmit the information bits to the serving base station,
    a power level, indicating a minimum power to be used by the UE to transmit the information bits to the serving base station,
    one or more Discontinued Reception, DRX, configuration parameters to be used by the UE to operate a DRX mechanism.

According to a thirteenth aspect, a base station is provided comprising processing circuitry, which in operation, receives, from a user equipment, UE, served by the base station, an assistance report. The assistance report comprising assistance information. The processing circuitry, when in operation, determines radio resources to be assigned to the UE to perform an uplink transmission, based on the received assistance information. A transmitter, when in operation, transmits a radio resource assignment to the UE, indicating the determined radio resources. The assistance information indicates one or more of the following assistance information types:
  a number of information bits, to be transmitted by the UE to the serving base station,
  a transport block size of a transport block to be used by the UE to transmit the information bits to the serving base station,
  a power level, indicating a minimum power to be used by the UE to transmit the information bits to the serving base station,
  one or more Discontinued Reception, DRX, configuration parameters to be used by the UE to operate a DRX mechanism.

According to a fourteenth aspect, a user equipment is provided comprising a transmitter, which in operation, transmits, to a serving base station of the UE, an extension request for extending an active time of a Discontinued Reception, DRX, mechanism. The extension request is transmitted during the active time. The UE comprises processing circuitry, which in operation, autonomously determines to extend the active time, upon transmitting the extension request. The UE operates according to the extended active time.

According to a fifteenth aspect, provided in addition to the fourteenth aspect, the transmitter, when in operation, transmits the extension request together with one or more of the following:
  Information on a trigger for transmitting the extension request, such as a new buffer status report to be transmitted by the UE to the serving base station, or a new power headroom report to be transmitted by the UE to the serving base station,
  a number of bits expected to be sent by the UE to the serving base station,
  a power level needed to transmit new data to be transmitted by the UE to the serving base station,
  a time period for which the active shall be extended.

According to a sixteenth aspect, provided in addition to the fourteenth or fifteenth aspect, the transmitter, when in operation, transmits the extension request using one of the following uplink radio resources:
  radio resources of the uplink control channel, optionally the last radio resource of the uplink control channel before the active time expires,
  radio resources of the uplink shared channel, optionally the last radio resource of the uplink shared channel before the active time expires.

According to a seventeenth aspect, provided in addition to any of the fourteenth to sixteenth aspects, the transmitter, when in operation, transmits, to the serving base station, a sleep request to exit the extended active time and enter a sleep period of the DRX mechanism. The receiver, when in operation, receives, from the serving base station, a sleep instruction. The processing circuitry, when in operation, determines, based on the sleep instruction, to exit active time and enter the sleep period of the DRX mechanism.

According to an eighteenth aspect, provided in addition to any of the fourteenth to seventeenth aspects, during the extended active time, the transmitter, when in operation, transmits one or more of a buffer status report, a power headroom report, and uplink data, to the serving base station, and the receiver, when in operation, monitors a downlink control channel so as to receive control information from the serving base station.

According to a nineteenth aspect, a method is provided comprising the following steps performed by a user equipment, UE:

transmitting, to a serving base station of the UE, an extension request for extending an active time of a Discontinued Reception, DRX, mechanism, wherein the extension request is transmitted during the active time, autonomously determining to extend the active time, upon transmitting the extension request, operating the UE according to the extended active time.

According to a twentieth aspect, a base station is provided comprising a receiver, which in operation, receives, from a UE, an extension request for extending an active time of a Discontinued Reception, DRX, mechanism. The extension request is transmitted during the active time. The base station further comprises processing circuitry, which in operation, determines that the UE autonomously extends the active time, upon transmitting the extension request and that the UE operates according to the extended active time. The base station operates according to the extended active time.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE) comprising:
processing circuitry, which in operation, determines assistance information to be transmitted to a serving base station of the UE, and
a transmitter, which in operation, transmits an assistance report to the serving base station of the UE, the assistance report comprising the determined assistance information,
wherein the assistance information indicates one or more of the following assistance information types:
a number of information bits, to be transmitted by the UE to the serving base station, wherein the number of information bits is determined based on one or more traffic characteristics, or
a transport block size of a transport block to be used by the UE to transmit the information bits to the serving base station, wherein the one or more traffic characteristics include:
a typical packet size of the uplink traffic, U, to be transmitted by the UE to the serving base station,
an typical arrival time of the uplink traffic, T, and
a latency requirement to be fulfilled for the uplink traffic, L,
wherein the number of information bits, I, is determined based on the following formula:

$$I=U*\text{ceiling}(L/T).$$

2. The user equipment according to claim 1, further comprising a receiver, which in operation, receives from the serving base station a radio resource assignment usable by the UE to perform an uplink transmission.

3. The user equipment according to claim 1, wherein the processing circuitry, when in operation, determines the transport block size of a transport block, based on the following:
the number of information bits, I,
a coding rate, C, and
a modulation order, M,
wherein the transport block size (TBS) is determined based on the following formula:

$$TBS=I*C/M.$$

wherein the processing circuitry, when in operation, determines the coding rate and the modulation order from a modulation and coding scheme (MCS) level, assigned to the UE by the serving base station in a previous uplink radio resource assignment or in a reference MCS level.

4. The user equipment according to claim 1, wherein the processing circuitry, when in operation, determines the assistance information per type of traffic and/or per logical channel group.

5. The user equipment according to claim 1, wherein the assistance information comprises a separate value for each assistance information type, wherein the separate value is determined by the processing circuitry, based on an association between different separate values and the association information type,
wherein the assistance information comprises one joint value for a combination of two or more of the assistance information types, wherein the joint value is determined by the processing circuitry, based on an association between different joint values and different combinations of assistance information types,
wherein the association is configured by the UE based on an RRC message received from the serving base station.

6. The user equipment according to claim 1, wherein the assistance information indicates one or more of the following assistance information types:
a power level, indicating a minimum power to be used by the UE to transmit the information bits to the serving base station, or
one or more Discontinued Reception (DRX) configuration parameters to be used by the UE to operate a DRX mechanism.

7. The user equipment according to claim 6, wherein the processing circuitry, when in operation, determines the power level based on:
the number of information bits, I,
a frequency bandwidth needed for transmitting the information bits from the UE to the serving base station, BW, and
pathloss measurement of the path between the UE and the serving base station, PL,
wherein the power level, P, is determined based on the following formula:

$$P=10*lg(BW)+Po+\text{alpha}*PL,$$

where Po and alpha are configured by the higher layer in a RRC message.

8. A method comprising the following steps performed by a user equipment (UE):
determining assistance information to be transmitted to a serving base station of the UE, and
transmitting an assistance report to the serving base station of the UE, the assistance report comprising the determined assistance information,
wherein the assistance information indicates one or more of the following assistance information types:
a number of information bits, to be transmitted by the UE to the serving base station, wherein the number of information bits is determined based on one or more traffic characteristics, or
a transport block size of a transport block to be used by the UE to transmit the information bits to the serving base station,
wherein the one or more traffic characteristics include:
a typical packet size of the uplink traffic, U, to be transmitted by the UE to the serving base station,
an typical arrival time of the uplink traffic, T, and
a latency requirement to be fulfilled for the uplink traffic, L,
wherein the number of information bits, I, is determined based on the following formula:

$$I=U*\text{ceiling}(L/T).$$

9. The method according to claim 8, wherein the assistance information indicates one or more of the following assistance information types:
a power level, indicating a minimum power to be used by the UE to transmit the information bits to the serving base station, or
one or more Discontinued Reception (DRX) configuration parameters to be used by the UE to operate a DRX mechanism.

10. A base station comprising:
processing circuitry, which in operation, receives, from a user equipment (UE) served by the base station, an assistance report, the assistance report comprising assistance information,
the processing circuitry, when in operation, determining radio resources to be assigned to the UE to perform an uplink transmission, based on the received assistance information, and
a transmitter, which in operation, transmits a radio resource assignment to the UE, indicating the determined radio resources,
wherein the assistance information indicates one or more of the following assistance information types:
a number of information bits, to be transmitted by the UE to the serving base station, wherein the number of information bits is determined based on one or more traffic characteristics, or
a transport block size of a transport block to be used by the UE to transmit the information bits to the serving base station, wherein the one or more traffic characteristics include:
a typical packet size of the uplink traffic, U, to be transmitted by the UE to the serving base station,
an typical arrival time of the uplink traffic, T, and
a latency requirement to be fulfilled for the uplink traffic, L,
wherein the number of information bits, I, is determined based on the following formula:

$$I = U * \text{ceiling}(L/T).$$

11. The base station according to claim 10, wherein the assistance information indicates one or more of the following assistance information types:
a power level, indicating a minimum power to be used by the UE to transmit the information bits to the serving base station, or
one or more Discontinued Reception (DRX) configuration parameters to be used by the UE to operate a DRX mechanism.

* * * * *